(12) United States Patent
Shiriike et al.

(10) Patent No.: US 7,244,207 B2
(45) Date of Patent: Jul. 17, 2007

(54) FRICTIONAL FORCED POWER TRANSMISSION BELT AND BELT DRIVE SYSTEM WITH THE SAME

(75) Inventors: Hiroyuki Shiriike, Hyogo (JP); Hiroyuki Tachibana, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 464 days.

(21) Appl. No.: 10/813,000

(22) Filed: Mar. 31, 2004

(65) Prior Publication Data

US 2004/0214676 A1   Oct. 28, 2004

(30) Foreign Application Priority Data

Apr. 25, 2003   (JP) ............................. 2003-122010

(51) Int. Cl.
*F16G 5/20*   (2006.01)

(52) U.S. Cl. .................................................... 474/260

(58) Field of Classification Search ................ 474/205, 474/237, 260, 263; 198/846, 847
See application file for complete search history.

(56) References Cited

U.S. PATENT DOCUMENTS 5,188,882 A * 2/1993 Uchiyama et al. .......... 428/159
5,430,117 A * 7/1995 Kawasaki et al. .......... 526/336
5,610,217 A * 3/1997 Yarnell et al. .............. 524/397
2002/0187869 A1* 12/2002 Martin et al. ............... 474/260

FOREIGN PATENT DOCUMENTS

| JP | 06-288439 | 10/1994 |
|----|-----------|---------|
| JP | 07-063241 | 3/1995 |
| JP | 2001-165244 | 6/2001 |
| JP | 2002-277934 | 8/2002 |
| JP | 2003-012871 | 1/2003 |

* cited by examiner

*Primary Examiner*—Vicky A. Johnson
(74) *Attorney, Agent, or Firm*—Nixon Peabody LLP; Donald R. Studebaker (57) ABSTRACT

A frictional forced power transmission belt transmits power to a pulley with its belt body wound around and in contact with the pulley. At least a contact part of the belt body with a pulley is formed of a rubber composition in which powdery or granular polyolefin resin is contained in ethylene-α-olefin elastomer.

7 Claims, 7 Drawing Sheets

|  | Ex. 1 | Ex. 2 | Ex. 3 | Ex. 4 | Ex. 5 | Ex. 6 | Ex. 7 |
|---|---|---|---|---|---|---|---|
| EPDM | 100 | 100 | 100 | 100 | 100 | 100 | 100 |
| CR |  |  |  |  |  |  |  |
| Carbon black | 75 | 75 | 75 | 75 | 75 | 75 | 75 |
| Softener | 14 | 14 | 14 | 14 | 14 | 14 | 14 |
| Plasticizer |  |  |  |  |  |  |  |
| Zinc oxide | 5 | 5 | 5 | 5 | 5 | 5 | 5 |
| Stearic acid | 1 | 1 | 1 | 1 | 1 | 1 | 1 |
| Antioxidant | 2.5 | 2.5 | 2.5 | 2.5 | 2.5 | 2.5 | 2.5 |
| Organic peroxide | 2.5 | 2.5 | 2.5 | 2.5 | 2.5 | 2.5 | 2.5 |
| Sulphur |  |  |  |  |  |  |  |
| Vulcanization accelerator |  |  |  |  |  |  |  |
| MgO |  |  |  |  |  |  |  |
| Short fibers | 25 | 25 | 25 | 25 | 25 | 25 | 25 |
| Polyethylene (1) | 0 | 5 | 10 | 40 | 50 |  |  |
| Polyethylene (2) |  |  |  |  |  | 10 |  |
| Polyethylene (3) |  |  |  |  |  |  | 10 |
| Polyethylene (4) |  |  |  |  |  |  |  |
| Polyethylene (5) |  |  |  |  |  |  |  |
| Polyethylene (6) |  |  |  |  |  |  |  |
| Polyethylene (7) |  |  |  |  |  |  |  |
| Polypropylene |  |  |  |  |  |  |  |
| Sound pressure (dB) | 88 | 75 | 61 | 61 | 61 | 63 | 70 |
| Belt flex life (hours) | ≥1000 | ≥1000 | ≥1000 | 805 | 305 | ≥1000 | ≥1000 |
| Abrasion loss (cm³) | 1.1 | 1.1 | 1.1 | 0.9 | 0.9 | 1.0 | 1.1 |

FIG. 6B

|  | Ex. 8 | Ex. 9 | Ex.10 | Ex.11 | Ex.12 | Ex.13 | Ex.14 |
|---|---|---|---|---|---|---|---|
| EPDM | 100 | 100 | 100 | 100 | 100 |  | 100 |
| CR |  |  |  |  |  | 100 |  |
| Carbon black | 75 | 75 | 75 | 75 | 75 | 75 | 75 |
| Softener | 14 | 14 | 14 | 14 | 14 |  | 14 |
| Plasticizer |  |  |  |  |  | 5 |  |
| Zinc oxide | 5 | 5 | 5 | 5 | 5 | 5 | 5 |
| Stearic acid | 1 | 1 | 1 | 1 | 1 | 1 | 1 |
| Antioxidant | 2.5 | 2.5 | 2.5 | 2.5 | 2.5 | 2.5 | 2.5 |
| Organic peroxide | 2.5 | 2.5 | 2.5 |  | 2.5 |  | 2.5 |
| Sulphur |  |  |  | 1.6 |  |  |  |
| Vulcanization accelerator |  |  |  | 4 |  |  |  |
| MgO |  |  |  |  |  | 4 |  |
| Short fibers | 25 | 25 | 25 | 25 | 25 | 25 | 25 |
| Polyethylene (1) |  |  |  | 10 |  | 10 |  |
| Polyethylene (2) |  |  |  |  |  |  |  |
| Polyethylene (3) |  |  |  |  |  |  |  |
| Polyethylene (4) | 10 |  |  |  |  |  |  |
| Polyethylene (5) |  | 10 |  |  |  |  |  |
| Polyethylene (6) |  |  | 10 |  |  |  |  |
| Polyethylene (7) |  |  |  |  | 10 |  |  |
| Polypropylene |  |  |  |  |  |  | 10 |
| Sound pressure (dB) | 62 | 61 | 62 | 73 | 75 | 90 | 76 |
| Belt flex life (hours) | ≥1000 | 895 | 820 | ≥1000 | ≥1000 | 780 | ≥1000 |
| Abrasion loss (cm³) | 1.1 | 0.8 | 0.8 | 1.1 | 1.1 | 1.8 | 1.1 |

FRICTIONAL FORCED POWER TRANSMISSION BELT AND BELT DRIVE SYSTEM WITH THE SAME

BACKGROUND OF THE INVENTION (a) Field of the Invention

This invention relates to frictional forced power transmission belts for transmitting power with their belt body wound around and in contact with a pulley, and relates to belt drive systems with the same.

(b) Description of the Related Art

Widespread use is made of serpentine belt drive systems for transmitting power from a crank shaft of an automotive engine to accessories such as a power steering, an air compressor and an alternator via a single V-ribbed belt in order to reduce the space for an engine room. Under these circumstances, such a V-ribbed belt is required to have a high power transmission capacity. In addition, the V-ribbed belt is also required to have a high noiselessness during belt run for the pursuit of a comfortable ride on a vehicle and other purposes. For these purposes, a typical V-ribbed belt is reinforced by short fibers mixed in a compression rubber layer that makes contact with pulleys so as to be oriented in a belt widthwise direction, and the short fibers protrude beyond the belt surface to reduce the coefficient of friction of the belt surface, resulting in reduced noise production and improved abrasion resistance.

Japanese Unexamined Patent Publication No. 7-63241 discloses a power transmission V-belt comprising an adhesion rubber layer in which a cord is embedded along a belt lengthwise direction and a compression rubber layer which adjoins the bottom face of the adhesion rubber layer and in which short fibers are embedded along a belt widthwise direction so that some of the widthwise short fibers protrude beyond the belt side faces. In this V-belt, the short fibers in the compression rubber layer are formed of para-aramid and/or meta-aramid fibers of 2 mm to 10 mm length oriented in the belt widthwise direction, and pulp-like para-aramid fibers some of which have a largest length of 2 mm and 80% or more of which have a length of 1 mm or less. This publication describes that the power transmission V-belt sufficiently exhibits the effects of aramid fibers mixed in the compression rubber layer of the belt and concurrently improves the abrasion resistance and non-stickiness of the compression rubber layer.

Japanese Unexamined Patent Publication No. 2001-165244 discloses a V-ribbed belt in which a compression rubber layer contains short cotton fibers and short para-aramid fibers some of which protrude from the rib surface, the protruding short para-aramid fibers are fibrillated, and the contents of the short cotton fibers and the short para-aramid fibers are 10 to 40 parts by weight and 5 to 10 parts by weight, respectively, with respect to 100 parts by weight of rubber in the compression rubber layer. This publication describes that in use as an automotive belt for an engine having large variations in rpm, the V-ribbed belt can eliminate noise production by suppressing minute slips during wet run.

Japanese Unexamined Patent Publication No. 2002-227934 discloses a V-ribbed belt that has a structure in which a cord is embedded in an adhesion rubber layer along the belt lengthwise direction, a compression rubber layer with a plurality of ribs extending in the belt lengthwise direction is stacked on the bottom of the adhesion rubber layer, a cover fabric is stacked as a tension layer on the top of the adhesion rubber layer, and the compression rubber layer contains 5 to 40 parts by mass of short fibers with respect to 100 parts by mass of its rubber component. The publication describes that there can be obtained a power transmission belt having excellent power transmission capacities during both normal and wet runs and a high noise reduction effect at low tension.

Japanese Unexamined Patent Publication No. 2003-12871 discloses a V-ribbed belt formed of an elastic body layer including an adhesion rubber layer in which a cord is embedded along the belt lengthwise direction and a compression rubber layer, wherein out of the elastic body layer consisting of the adhesion rubber layer and the compression rubber layer, at least the compression rubber layer is made of a vulcanizate of an ethylene-α-olefin elastomer compound, the ethylene content of the ethylene-α-olefin elastomer is 60 to 75 mass %, one or more kinds of short fibers of 0.5 mm to 3 mm length are contained as reinforcing fibers in the compression rubber layer, and the total amount of addition of the short fibers is 10 to 30 parts by mass to 100 parts by mass of the ethylene-α-olefin elastomer. This publication describes that such a short fiber-containing rubber composition excellent in sheetability is used at least for the compression rubber layer, thereby providing a high-durability power transmission belt having excellent flexural fatigue resistance and heat resistance, cold resistance, abrasion resistance and sticking abrasion resistance.

Japanese Unexamined Patent Publication No. 6-288439 discloses a power transmission belt which is made of urethane elastomer but in which powders of polyolefin such as polyethylene or polypropylene are dispersed. This publication describes that there can be obtained a power transmission belt of urethane elastomer that has an excellent abrasion resistance, does not break even when driven at high load and high speed under high-temperature conditions, and thereby exhibits a long life.

When the amount of short fibers mixed into the compression rubber layer of a V-ribbed belt is increased, the number of short fibers exposed at the belt surface is also increased and therefore the effects of improving noise reduction performance and abrasion resistance becomes large.

Increasing the amount of short fibers mixed, however, makes it difficult to uniformly knead the rubber composition containing short fibers for the formation of a compression rubber layer and mould it in the shape of a sheet. For this reason, only at most 25 parts by mass of short fibers can be mixed into 100 parts by mass of a rubber component of the compression rubber layer. Furthermore, the short fibers are fabricated by cutting long fibers, and need to be subjected to adhesion treatment in order to be given adhesiveness to the rubber, resulting in high material unit cost. Therefore, an increase in the amount of short fibers mixed leads to a rise in the material cost of the belt.

SUMMARY OF THE INVENTION

An object of the present invention is to enhance the noise reduction performance and abrasion resistance of a frictional forced power transmission belt.

In order to achieve the above object, the present invention is directed to a frictional forced power transmission belt for transmitting power with a belt body thereof wound around and in contact with a pulley, wherein at least a contact part of the belt body with a pulley is formed of a rubber composition in which powdery or granular polyolefin resin is contained in ethylene-α-olefin elastomer.

With the above structure, the rubber component of the rubber composition forming at least the contact part of the belt body with a pulley is ethylene-α-olefin elastomer, and this rubber component itself has a low coefficient of friction. In addition, powdery or granular polyolefin resin is dispersed in the belt body, and polyolefin resin exposed to the belt surface reduces the coefficient of friction. For these reasons, a frictional forced power transmission belt of this invention has an excellent noise reduction performance and abrasion resistance. Furthermore, since ethylene-α-olefin elastomer has a high affinity to polyolefin resin, this provides a very excellent dispersing condition of polyolefin resin into the belt body.

In the frictional forced power transmission belt of this invention, the polyolefin resin is preferably polyethylene resin having a molecular weight of 500,000 or more, and more preferably polyethylene resin having a molecular weight of 1,000,000 to 5,000,000. The molecular weight is measured by viscometry.

When the content of polyolefin resin is 5 or less parts by mass to 100 parts by mass of the rubber component constituting the belt body, the effects of improving noise reduction performance and abrasion resistance become low. On the other hand, when the content of polyolefin resin is 50 or more parts by mass to 100 parts by mass of the rubber component constituting the belt body, a large number of defects developed from polyolefin resin is included in the belt body, which degrades belt durability.

Therefore, in the frictional forced power transmission belt of the present invention, the polyolefin resin preferably has a content of more than 5 but less than 50 parts by mass to 100 parts by mass of the rubber component constituting the belt body.

In the frictional forced power transmission belt of the present invention, the polyolefin resin preferably has a grain size larger than 25 μm.

In the frictional forced power transmission belt of the present invention, the ethylene-α-olefin elastomer in the rubber composition forming at least the contact part of the belt body with the pulley is preferably cross-linked with an organic peroxide.

The frictional forced power transmission belt of the present invention is not particularly restricted so long as it is of the types that transmit power to a pulley with their belt body wound around and in contact with the pulley, such as raw edge V-belts and flat belts, but is especially suitable as a V-ribbed belt for use in automotive applications.

A belt drive system excellent in noise reduction performance can be constructed by a plurality of pulleys and a frictional forced power transmission belt of the present invention whose belt body is wound around and in contact with at least one of the plurality of pulleys.

BRIEF DESCRIPTION OF THE DRAWINGS

Further objects, features and advantages of the present invention will become apparent from the following description with reference to the accompanying drawings.

DETAILED DESCRIPTION OF THE PREFERRED EMBODIMENTS

Hereinafter, embodiments of the present invention will be described in detail with reference to the drawings.

Embodiment 1

Figure 1:
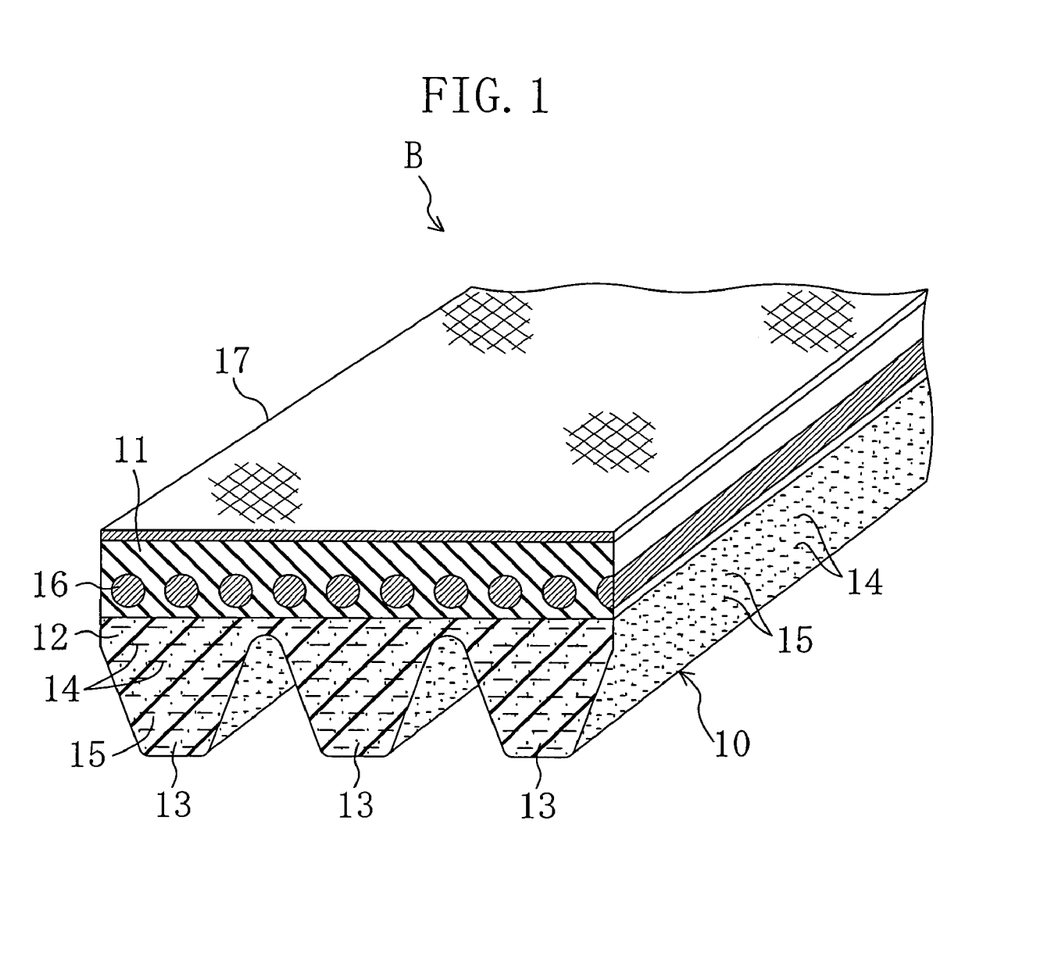
FIG. 1 is a perspective view of a V-ribbed belt according to a first embodiment of the present invention.

FIG. 1 illustrates a V-ribbed belt B according to a first embodiment of the present invention.

This V-ribbed belt B comprises a V-ribbed belt body 10, a cord 16 embedded in the V-ribbed belt body 10 to form a spiral at certain pitches in the belt widthwise direction, and a back face reinforcement fabric 17 provided to cover the back face side of the V-ribbed belt body 10.

The V-ribbed belt body 10 is made of a rubber composition in which ethylene-α-olefin elastomer such as ethylene-propylene-diene monomer rubber (EPDM) is contained as a rubber component and the rubber component is cross-linked with an organic peroxide. The V-ribbed belt body 10 has a structure in which an adhesion rubber layer 11 having the cord 16 embedded therein and an underlying compression rubber layer 12 are stacked into one piece. The compression rubber layer 12 serves as a part for making contact with a pulley located internally of the belt and transmitting power directly to the pulley. Therefore, in order to ensure that the belt has a wide contact area with the pulley, the compression rubber layer 12 is provided with ridge-like ribs 13 that extend in the belt lengthwise direction and are aligned in the belt widthwise direction. Furthermore, short fibers 14, such as aramid fibers or nylon fibers, oriented in the belt widthwise direction are mixed into the compression rubber layer 12, thereby reinforcing the compression rubber layer 12. At the same time, those of the short fibers 14 exposed to protrude from the belt surface reduce the coefficient of friction at the contact surface of the belt with the pulley.

Furthermore, powdery or granular polyolefin resin 15, such as ultra-high molecular weight polyethylene resin, is mixed and dispersed into the compression rubber layer 12. This also reduces the coefficient of friction at the contact surface of the belt with the pulley.

Where polyethylene resin is used as the polyolefin resin 15, it preferably has a ultra-high molecular weight of 500,000 or more (more preferably 1 million to 5 million). Furthermore, the polyolefin resin 15 preferably has a grain size larger than 25 μm, and a content of more than 5 but less than 50 parts by mass to 100 parts by mass of the rubber component constituting the belt body. Since ethylene-α-olefin elastomer, which is the rubber component of the rubber composition constituting the compression rubber layer 12, has a high affinity to the polyolefin resin 15, this provides a very excellent dispersing condition of the polyolefin resin 15 into the compression rubber layer 12.

The cord 16 is formed of twisted yarns of aramid fibers, polyester fibers or the like. In order to provide the cord 16 with adhesiveness to the V-ribbed belt body 10, the cord 16 is subjected, before moulding, to a series of treatments of soaking into a resorcinol-formaldehyde latex water solution (hereinafter, referred to as an RFL water solution) and heat application and a series of treatments of soaking into rubber cement and drying.

The back face reinforcement fabric 17 is formed of a woven fabric such as a plain weave fabric consisting of warp and weft yarns. In order to provide the back face reinforcement fabric 17 with adhesiveness to the V-ribbed belt body 10, the fabric 17 is subjected, before moulding, to a series of treatments of soaking into an RFL water solution and heat application and a series of treatments of rubber cement coating on its surface to be in contact with V-ribbed belt body 10 and drying.

In the V-ribbed belt B having the above structure, not only are short fibers 14 mixed into the compression rubber layer 12, but also the compression rubber layer 12, which is a contact part of the V-ribbed belt body 10 with the pulley, is made of a rubber composition into which powdery or granular polyolefin resin 15 is dispersed. Therefore, the polyolefin resin 15 exposed at the belt surface reduces the coefficient of friction at the contact part. In addition, since the rubber component of the rubber composition constituting the compression rubber layer 12 is ethylene-α-olefin elastomer having a low coefficient of friction, the V-ribbed belt B exhibits very excellent noise reduction performance and abrasion resistance.

Figure 2A:
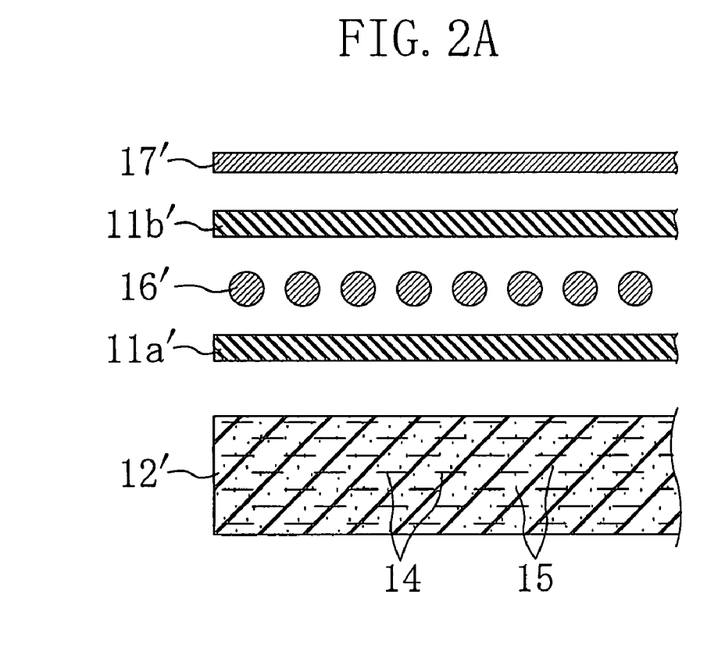
FIG. 2A illustrates construction materials of the V-ribbed belt.
Figure 2B:
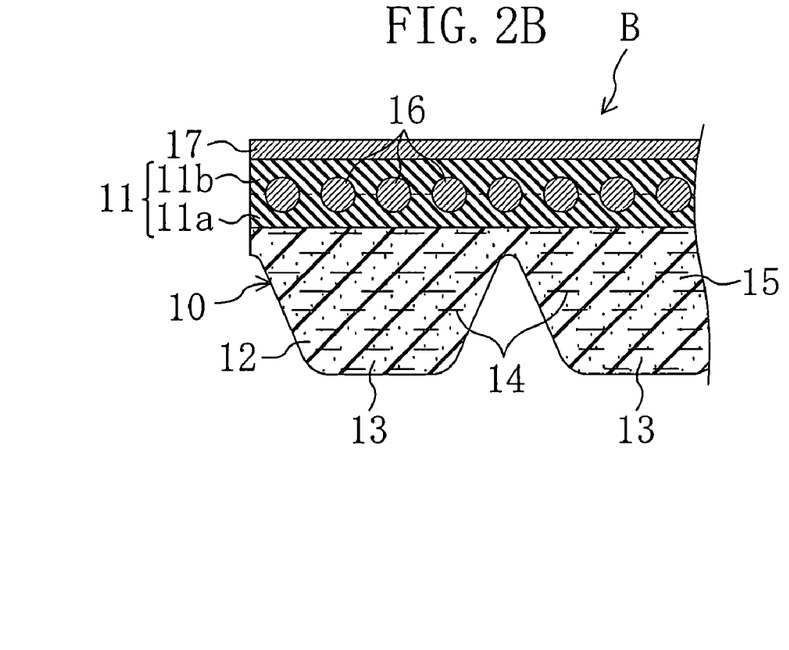
FIG. 2B shows the entire structure of the V-ribbed belt.

Next, description will be made of a method for producing a V-ribbed belt B having the above structure with reference to FIGS. 2A and AB.

The production of a V-ribbed belt B is made using an inner mould whose outer periphery has a moulding surface for forming the belt back face into a predetermined shape and a rubber sleeve whose inner periphery has a moulding surface for forming the belt inner face into a predetermined shape.

First, the outer periphery of the inner mould is covered with a woven fabric 17' which will be a back face reinforcement fabric 17, and an uncross-linked rubber sheet 11b' for forming a back face side portion 11b of an adhesion rubber layer 11 is then wrapped around the fabric 17'.

Consequently, a twisted yarn 16' which will be a cord 16 is wound spirally around the rubber sheet 11b', an uncross-linked rubber sheet 11a' for forming an inner face side portion 11a of the adhesion rubber layer 11 is then wrapped around the yarn-wound rubber sheet 11b', and an uncross-linked rubber sheet 12' for forming a compression rubber layer 12 is then wrapped around the rubber sheet 11a'. In this connection, material used for the uncross-linked rubber sheet 12' for forming a compression rubber layer 12 is that obtained by compounding ethylene-α-olefin elastomer such as ethylene-propylene-diene monomer rubber, which is used as a basic rubber component, with short fibers 14 oriented in the direction orthogonal to the sheet wrapping direction, polyolefin resin 15 such as powdery or granular polyethylene resin, and an organic peroxide serving as a cross-linking agent. In wrapping each of the uncross-linked rubber sheets 11b', 11a' and 12', its ends in the wrapping direction are not overlapped with but butted on each other.

Thereafter, the rubber sleeve is fitted on the moulded piece around the inner mould, they are set in a moulding oven, and the rubber sleeve is then radially inwardly pressed against the inner mould with a high pressure while the inner mould is being heated by high-temperature steam or the like. During the time, the rubber component is fluidized and concurrently a cross-linking reaction progresses, so that adhesion reactions of the twisted yarn 16' and woven fabric 17' on the rubber progress. As a result, a cylindrical belt slab is formed.

Then, the belt slab is removed from the inner mould and sectioned into plural portions in its lengthwise direction. Thereafter, the outer periphery of each portion is ground to form ribs 13.

Finally, the belt slab sectioned into plural portions and having ribs 13 formed on the outer periphery is sliced into pieces having a predetermined width, and each piece is reversed thereby obtaining a V-ribbed belt B.

Figure 3:
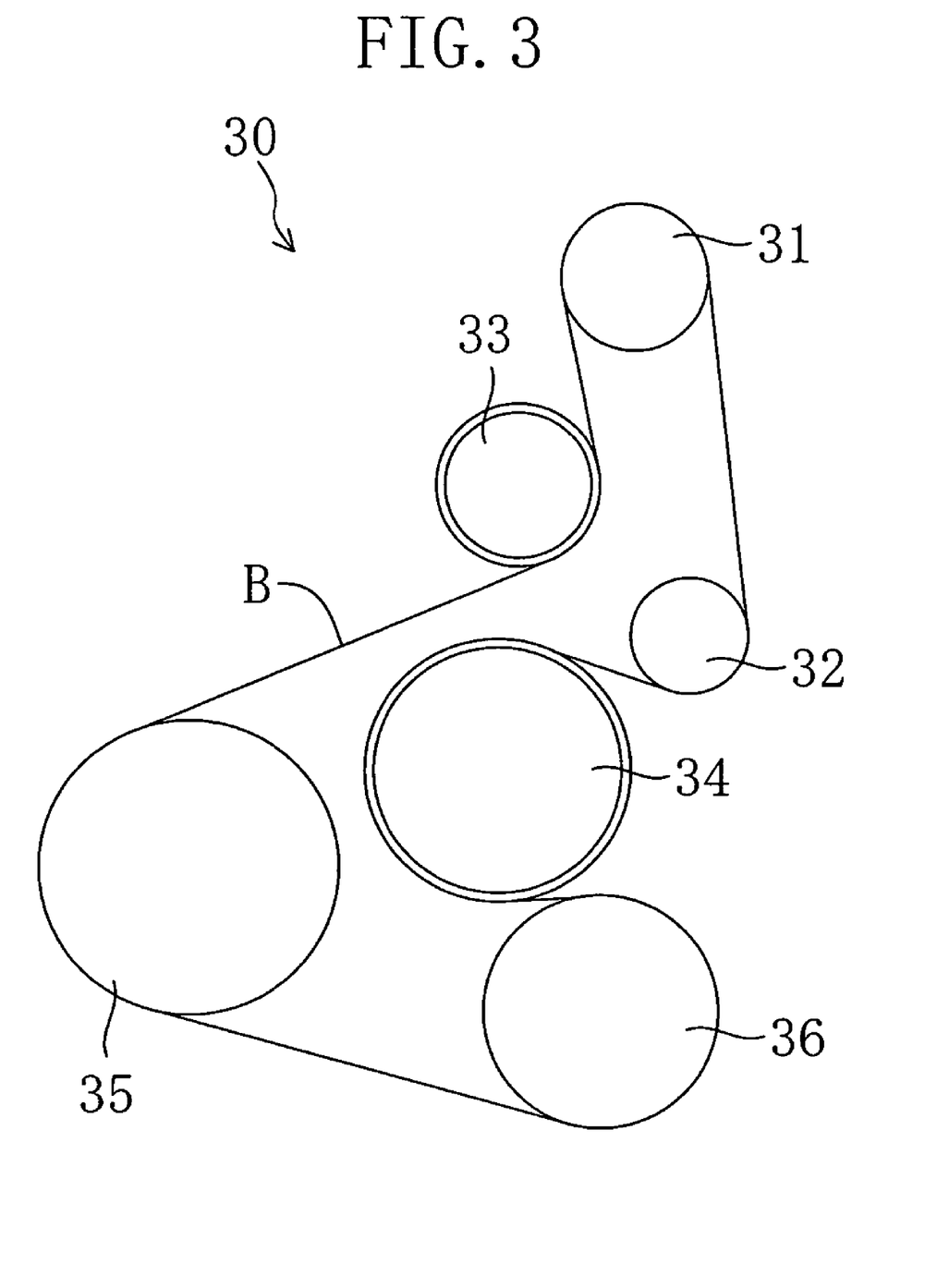
FIG. 3 illustrates the layout of a belt drive system for driving automotive accessories according to the first embodiment.

FIG. 3 shows the layout of an accessory belt drive system 30 of the serpentine drive type in an automotive engine using the V-ribbed belt B.

This layout of the accessory belt drive system 30 is formed by a power steering pulley 31 located at an uppermost position, an AC generator pulley 32 placed below the power steering pulley 31, a flat tensioner pulley 33 placed to the lower left of the power steering pulley 31, a flat water pump pulley 34 placed below the tensioner pulley 33, a crank shaft pulley 35 placed to the lower left of the tensioner pulley 33, and an air conditioner pulley 36 placed to the lower right of the crank shaft pulley 35. Among these pulleys, those other than the tensioner pulley 33 and the water pump pulley 34, which are flat pulleys, are all ribbed pulleys. The V-ribbed belt B is wound around the power steering pulley 31 to make contact at its ribs 13, then the tensioner pulley 33 to make contact at its back face, then sequentially the crank shaft pulley 35 and the air conditioner pulley 36 to make contact at its ribs 13, then the water pump pulley 34 to make contact at its back face, then the AC generator pulley 32 to make contact at its ribs 13, and finally returns to the power steering pulley 31.

Since the accessory belt drive system 30 uses a V-ribbed belt B according to the present invention, it exhibits very excellent noise reduction performance and abrasion resistance.

Embodiment 2

Figure 4:
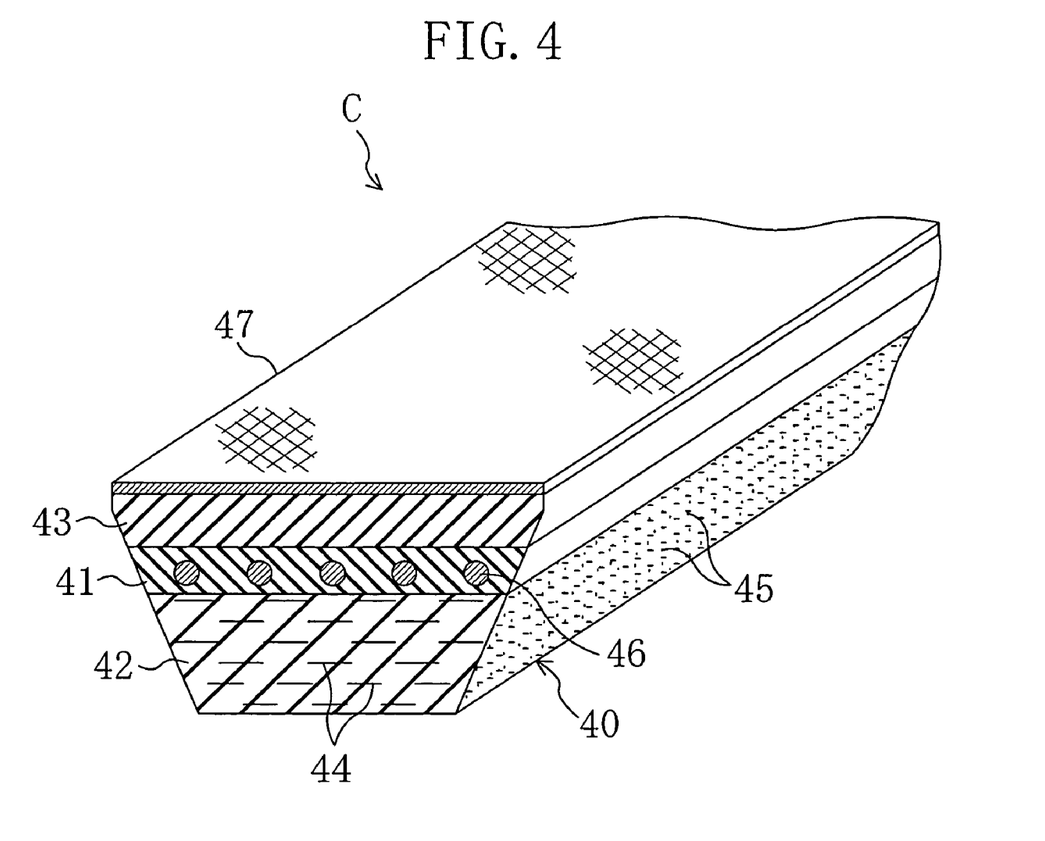
FIG. 4 is a perspective view of a V-belt according to a second embodiment of the present invention.

FIG. 4 shows a raw edge V-belt C according to a second embodiment of the present invention.

This V-belt C comprises a V-belt body 40, a cord 46 embedded in the V-belt body 40 to form a spiral at certain pitches in the belt widthwise direction, and a back face reinforcement fabric 47 provided to cover the back face side of the V-belt body 40.

The V-belt body 40 is made of a rubber composition in which ethylene-α-olefin elastomer such as ethylene-propylene-diene monomer rubber (EPDM) is contained as a rubber component and the rubber component is cross-linked with an organic peroxide. The V-belt body 40 has a structure in which an adhesion rubber layer 41 having the cord 46 embedded therein, a compression rubber layer 42 underlying the adhesion rubber layer 41 and a tension rubber layer 43 overlying the adhesion rubber layer 41 are stacked into one piece. Short fibers 44, such as aramid fibers or nylon fibers, oriented in the belt widthwise direction are mixed into the compression rubber layer 42, thereby reinforcing the compression rubber layer 42. At the same time, those of the short fibers 44 exposed to protrude from the belt surface reduce the coefficient of friction at the contact surface of the belt with the pulley. Furthermore, powdery or granular polyolefin resin 45, such as ultra-high molecular weight polyethylene resin, is mixed and dispersed into the compression rubber layer 42. This also reduces the coefficient of friction at the contact surface of the belt with the pulley. Where polyethylene resin is used as the polyolefin resin 45, it preferably has a ultra-high molecular weight of 500,000 or more (more preferably 1 million to 5 million ). Furthermore, the polyolefin resin 45 preferably has a grain size larger than 25 μm, and a content of more than 5 but less than 50 parts by mass to 100 parts by mass of the rubber component constituting the belt body. Since ethylene-α-olefin elastomer, which is the rubber component of the rubber composition constituting the compression rubber layer 42, has a high affinity to the polyolefin resin 45, this provides a very excellent dispersing condition of the polyolefin resin 45 into the compression rubber layer 42.

The cord 46 is formed of twisted yarns of aramid fibers, polyester fibers or the like. In order to provide the cord 46 with adhesiveness to the V-belt body 40, the cord 46 is subjected, before moulding, to a series of treatments of soaking into an RFL water solution and heat application and a series of treatments of soaking into rubber cement and drying.

The back face reinforcement fabric 47 is formed of a woven fabric such as a plain weave fabric consisting of warp and weft yarns. In order to provide the back face reinforcement fabric 47 with adhesiveness to the V-belt body 40, the fabric 47 is subjected, before moulding, to a series of treatments of soaking into an RFL water solution and heat application and a series of treatments of rubber cement coating on its surface to be in contact with V-belt body 40 and drying.

In the V-belt C having the above structure, not only are short fibers 44 mixed into the compression rubber layer 42, but also the compression rubber layer 42, which is a contact part of the V-belt body 40 with the pulley, is made of a rubber composition into which powdery or granular polyolefin resin 45 is dispersed. Therefore, the polyolefin resin 45 exposed at the belt surface reduces the coefficient of friction at the contact part. In addition, since the rubber component of the rubber composition constituting the compression rubber layer 42 is ethylene-α-olefin elastomer having a low coefficient of friction, the V-belt C exhibits very excellent noise reduction performance and abrasion resistance.

Other Embodiments

Although a frictional forced power transmission belt of the present invention has been described as a V-ribbed belt B in the first embodiment and a raw edge V-belt C in the second embodiment, it is not restrictive to these types but can be of other types such as other types of V-belts or flat belts.

Although in the first and second embodiments the rubber composition constituting the belt body 10 or 40 is obtained by cross-linking ethylene-α-olefin elastomer with an organic peroxide, this is not restrictive but a rubber composition obtained by cross-linking ethylene-α-olefin elastomer with sulphur can be used.

Hereinafter, description will be made of test evaluations on V-ribbed belts.

Test Evaluation Belt

Figure 6A:
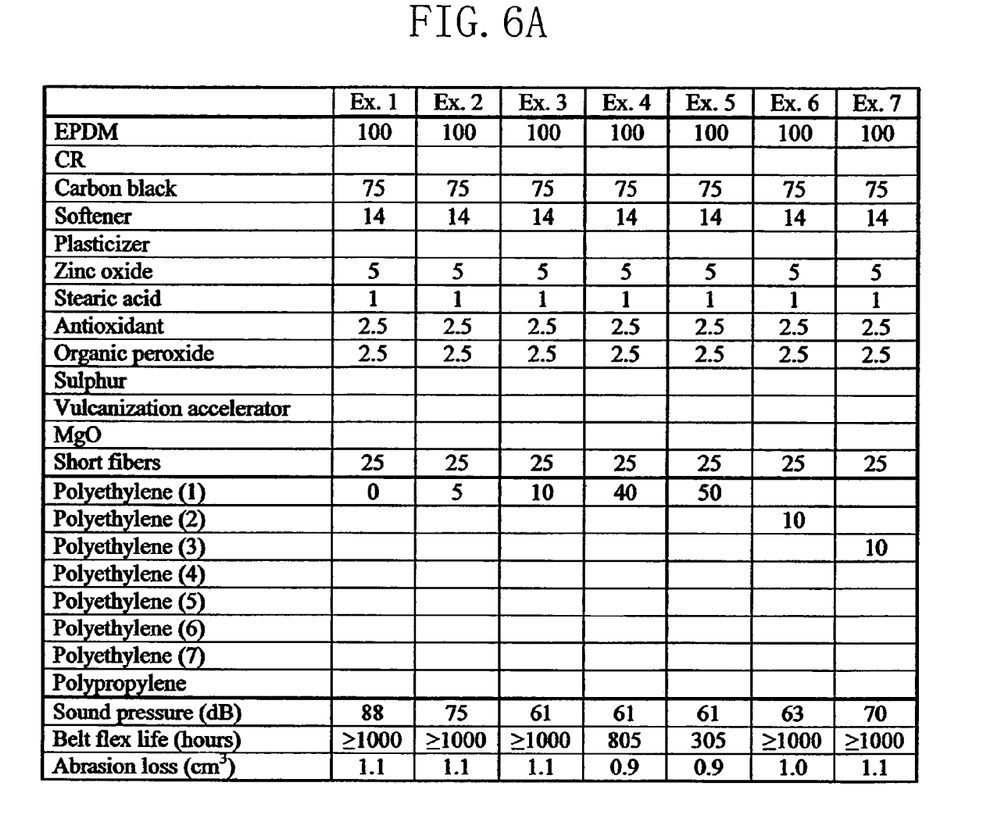
FIGS. 6A and 6B are tables showing the structures of test evaluation belts and test evaluation results.
Figure 6B:
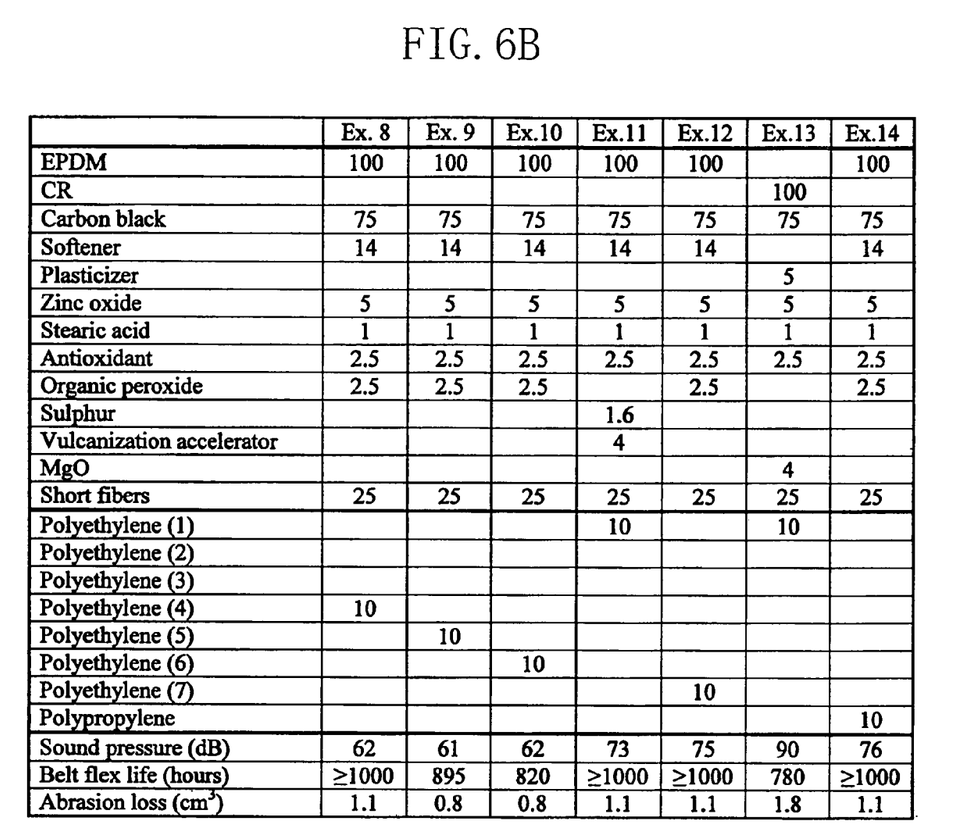

V-ribbed belts shown in the following Examples 1 to 10 were prepared. Their structures are also shown in FIGS. 6A and 6B.

EXAMPLE 1

As Example 1, a V-ribbed belt was prepared which has the same structure as in the first embodiment and in which the compression rubber layer is formed of a rubber composition obtained by using EPDM (ethylene content: 66%, diene content: ENB 4.5%) as its basic rubber component and compounding 100 parts by mass of the EPDM with 75 parts by mass of carbon black (FEF: 35 parts by mass, HAF: 40 parts by mass), 14 parts by mass of paraffin oil as a softener, 5 parts by mass of zinc oxide, 1 part by mass of stearic acid, 2.5 parts by mass of antioxidant, 2.5 parts by mass of organic peroxide as a cross-linking agent, and 25 parts by mass of short nylon fibers of 1 mm length. The adhesion rubber layer was also formed of a rubber composition containing EPDM as its basic rubber component.

EXAMPLE 2

As Example 2, a V-ribbed belt was prepared which has the same structure as in Example 1 except that 5 parts by mass of polyethylene resin (1) having a mean grain size of 120 μm and a molecular weight of 2 million (HI-ZEX™ MILLION 240S manufactured by Mitsui Chemicals, Inc.) was compounded into the rubber composition constituting the compression rubber with respect to 100 parts by mass of EPDM.

EXAMPLE 3

As Example 3, a V-ribbed belt was prepared which has the same structure as in Example 2 except that the content of polyethylene resin is 10 parts by mass.

EXAMPLE 4

As Example 4, a V-ribbed belt was prepared which has the same structure as in Example 2 except that the content of polyethylene resin is 40 parts by mass.

EXAMPLE 5

As Example 5, a V-ribbed belt was prepared which has the same structure as in Example 2 except that the content of polyethylene resin is 50 parts by mass.

EXAMPLE 6

As Example 6, a V-ribbed belt was prepared which has the same structure as in Example 3 except that polyethylene resin (2) having a mean grain size of 120 μm and a molecular weight of 500,000 (HI-ZEX™ MILLION 030S manufactured by Mitsui Chemicals, Inc.) was compounded into the rubber composition constituting the compression rubber.

EXAMPLE 7

As Example 7, a V-ribbed belt was prepared which has the same structure as in Example 3 except that polyethylene resin (3) having a mean grain size of 25 μm and a molecular weight of 2 million (MIPELON™ XM-221U manufactured by Mitsui Chemicals, Inc.) was compounded into the rubber composition constituting the compression rubber.

EXAMPLE 8

As Example 8, a V-ribbed belt was prepared which has the same structure as in Example 3 except that polyethylene resin (4) having a mean grain size of 30 μm and a molecular weight of 2 million (MIPELON™ XM-220 manufactured by Mitsui Chemicals, Inc.) was compounded into the rubber composition constituting the compression rubber.

EXAMPLE 9

As Example 9, a V-ribbed belt was prepared which has the same structure as in Example 3 except that polyethylene resin (5) having a mean grain size of 160 µm and a molecular weight of 2400,000 (HI-ZEX™ MILLION 240M manufactured by Mitsui Chemicals, Inc.) was compounded into the rubber composition constituting the compression rubber.

EXAMPLE 10

As Example 10, a V-ribbed belt was prepared which has the same structure as in Example 3 except that polyethylene resin (6) having a mean grain size of 165 µm and a molecular weight of 5900,000 (HI-ZEX™ MILLION 630M manufactured by Mitsui Chemicals, Inc.) was compounded into the rubber composition constituting the compression rubber.

EXAMPLE 11

As Example 11, a V-ribbed belt was prepared which has the same structure as in Example 1 except that instead of an organic peroxide, 1.6 parts by mass of sulphur acting as a cross-linking agent and 4 parts by mass of vulcanization accelerator were compounded into the rubber composition constituting the compression rubber with respect to 100 parts by mass of EPDM.

EXAMPLE 12

As Example 12, a V-ribbed belt was prepared which has the same structure as in Example 3 except that polyethylene resin (7) having a molecular weight of 5,000 (SANWAX 161-P manufactured by Sanyo Chemical Industries, Ltd.) was compounded into the rubber composition constituting the compression rubber.

EXAMPLE 13

As Example 13, a V-ribbed belt was prepared in which the compression rubber layer is formed of a rubber composition obtained by using chloroprene rubber (CR) as its basic rubber component and compounding 100 parts by mass of CR with 75 parts by mass of carbon black (FEF: 35 parts by mass, HAF: 40 parts by mass), 5 parts by mass of sebacic acid derivative as a plasticizer, 5 parts by mass of zinc oxide, 1 part by mass of stearic acid, 2.5 parts by mass of antioxidant, 4 parts by mass of magnesium oxide, 25 parts by mass of short nylon fibers of 1 mm length, and 100 parts by mass of polyethylene resin (1) having a mean grain size of 120 µm and a molecular weight of 2 million (HI-ZEX™ MILLION 240S manufactured by Mitsui Chemicals, Inc.). The adhesion rubber layer was also formed of a rubber composition containing CR as its basic rubber component.

EXAMPLE 14

As Example 14, a V-ribbed belt was prepared which has the same structure as in Example 3 except that polypropylene resin (HI-WAX™ NP105 manufactured by Mitsui Chemicals, Inc.) was compounded into the rubber composition constituting the compression rubber.

Test Evaluation Method

<Belt Flex Life>

Figure 5:
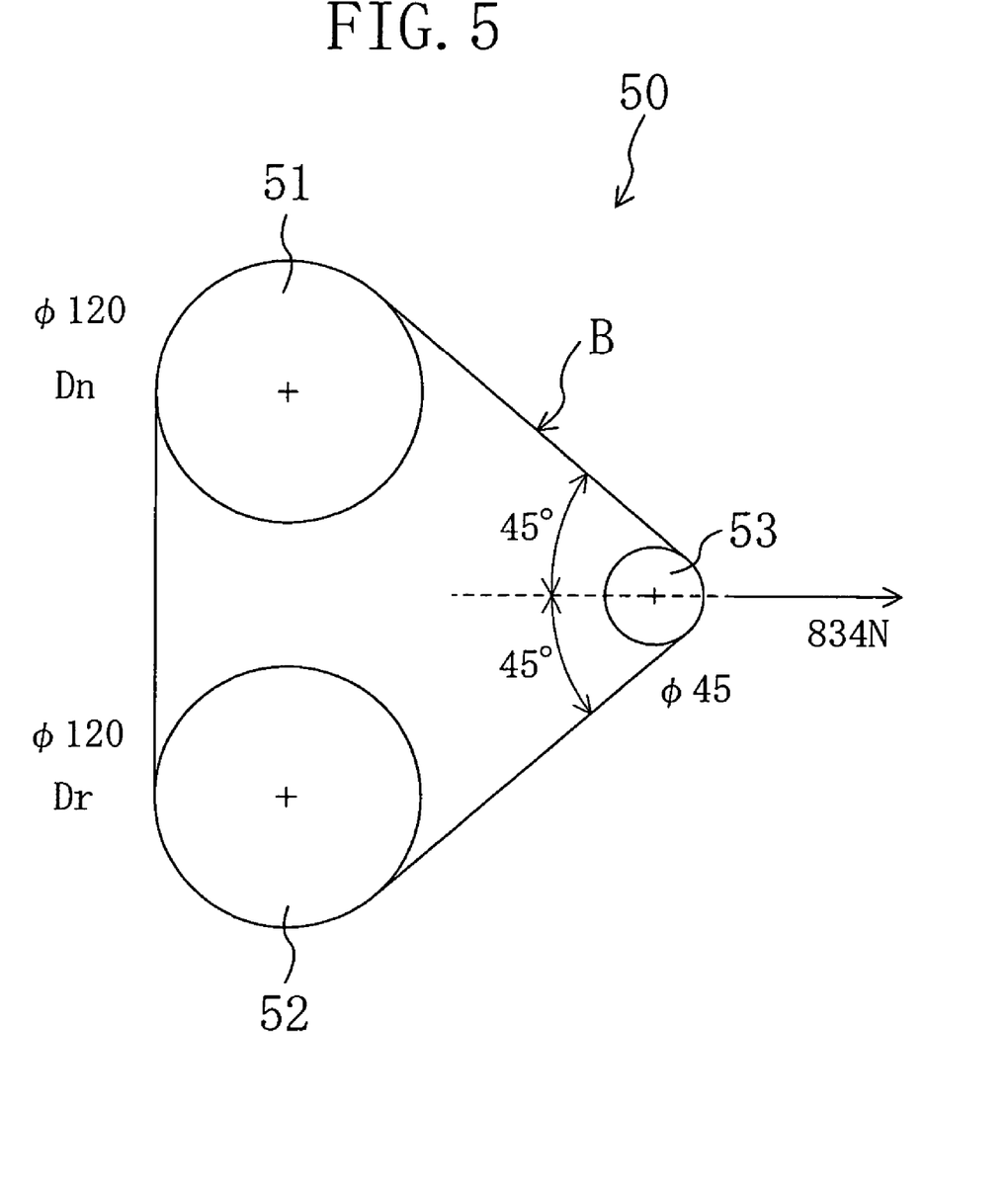
FIG. 5 illustrates the layout of a belt run tester for belt durability test.

FIG. 5 shows the layout of a belt run tester 50 for durability evaluation of V-ribbed belts B. This belt run tester 50 comprises large-diameter ribbed pulleys 51 and 52 of 120 mm pulley diameter disposed one above the other (the upper is a driven pulley and the lower is a drive pulley), and a small-diameter ribbed pulley 53 of 45 mm pulley diameter disposed rightward of and at a height intermediate the large-diameter ribbed pulleys. The small-diameter ribbed pulley 53 is positioned to form a belt winding angle of 90°.

A belt run test was conducted on each of the V-ribbed belts B of the above Examples 1 to 14 by winding each belt around the three ribbed pulleys 51 to 53, pulling the small-diameter ribbed pulley 53 laterally to impose a load on it by a set weight of 834N, and rotating the lower ribbed pulley 52, which is a drive pulley, at 4900 rpm in an atmosphere of 23° C. Under these conditions, the time from the start of the run until the failure of the belt was measured as a belt flex life.

<Amount of Abrasion Loss>

For each of the V-ribbed belts of Examples 1 to 14, the mass of the belt after 100 hours run in the above belt run test was measured and compared with that of the same belt before the belt run test, thereby calculating the amount of abrasion loss in terms of volume.

<Sound Pressure>

For each of the V-ribbed belts of Examples 1 to 14, the slip sound of the belt was measured after 300 hours run in the above belt run test.

Test Evaluation Results

The test results are shown in FIGS. 6A and 6B.

Referring to FIGS. 6A and 6B, comparisons between Example 1 and each of Examples 2 to 12 and 14, which are different in the existence or absence of polyolefin resin in the compression rubber layer, show that any one of Examples 2 to 12 and 14 containing polyolefin resin has a lower sound pressure than Example 1 containing no polyolefin resin. The reason for this is considered to be that polyolefin resin exposed at the belt surface reduces the coefficient of friction. Example 13 containing CR as a basic rubber component has the highest sound pressure and largest amount of abrasion loss in spite of inclusion of polyolefin resin. The reason for this is considered to be that CR has a very high coefficient of friction.

Comparisons among Examples 2 to 5 which are different in polyethylene resin content show that the V-ribbed belt tends to have a lower sound pressure and less amount of abrasion loss as its polyethylene resin content is increased. The reason for this is considered to be that as the polyethylene resin content is increased, the amount of polyethylene resin exposed at the belt surface becomes larger and therefore the effect of reducing the coefficient of friction is more enhanced. On the other hand, the comparisons also show that as the polyethylene resin content is increased, the belt flex life becomes shorter. The reason for this is considered to be that as the polyethylene resin content is increased, the V-ribbed belt body includes a larger number of defects developed from polyethylene resin.

Comparisons among Examples 3, 6 to 10 and 12, which are different in the molecular weight and mean grain size of polyethylene resin, show that Example 12 including polyethylene resin with a very low molecular weight of 5000 has a higher sound pressure and larger amount of abrasion loss than the others. The comparisons also show that Examples 9 and 10 having a high molecular weight of polyethylene resin is a lower sound pressure and less abrasion loss but a shorter belt flex life. Therefore, it can be considered that a molecular weight of polyethylene resin of 500,000 or more would provide a sufficiently large effect of reducing the coefficient of friction at the belt surface. Furthermore, if the belt durability is also considered, it is desirable that the molecular weight of polyethylene resin is not too high.

A comparison between Examples 3 and 11 using different cross-linking agents shows that Example 3 using an organic peroxide as a cross-linking agent has a lower sound pressure than Example 11 using sulphur as a cross-linking agent. Therefore, it is considered that in order to obtain a V-ribbed belt exhibiting an excellent noise reduction performance, organic peroxide-based cross-linking agents are preferable to sulphur-based cross-linking agents.

Comparisons between each of Examples 3, 6 to 10 and 12 and Example 14, which are different in the type of compounded polyolefin resin, show that Examples 3, 6 to 10 and 12 in which polyethylene resin was compounded have a lower sound pressure than Example 14 in which polypropylene resin was compounded. Therefore, it is considered that in order to obtain a V-ribbed belt exhibiting an excellent noise reduction performance, polyethylene resin is more preferably used as polyolefin resin than polypropylene resin.

In Examples 3 and 6 to 10, the mean grain size of polyethylene resin is within the range of 25 μm to 165 μm. In this range, however, the influence of grain sizes on the belt properties cannot be recognized. In other words, if the mean grain size of polyethylene resin is at least 25 μm or more, there can be provided the effect of reducing the coefficient of friction at the belt surface.

The foregoing discloses and describes merely exemplary embodiments of the present invention. One skilled in the art will readily recognize, from such discussion and accompanying drawings and claims, that various changes, modifications and variations can be made therein without departing from the spirit and scope of the present invention.

What is claimed is:

1. A frictional forced power transmission belt for transmitting power with a belt body thereof wound around and in contact with a pulley,
    wherein at least a contact part of the belt body with a pulley is formed of a rubber composition in which powdery or granular polyolefin resin is contained in ethylene-α-olefin elastomer.

2. The frictional forced power transmission belt of claim 1, wherein the polyolefin resin is polyethylene resin having a molecular weight of 500,000 or more.

3. The frictional forced power transmission belt of claim 1, wherein the polyolefin resin has a content of more than 5 but less than 50 parts by mass to 100 parts by mass of a rubber component constituting the belt body.

4. The frictional forced power transmission belt of claim 1, wherein the polyolefin resin has a grain size larger than 25 μm.

5. The frictional forced power transmission belt of claim 1, wherein the ethylene-α-olefin elastomer in the rubber composition forming at least the contact part of the belt body with the pulley is cross-linked with an organic peroxide.

6. The frictional forced power transmission belt of claim 1, wherein the belt body is a V-ribbed belt body.

7. A belt drive system comprising:
    a plurality of pulleys; and
    a frictional forced power transmission belt whose belt body is wound around and in contact with at least one of the plurality of pulleys,
    wherein at least a contact part of the belt body of the frictional forced power transmission belt with the pulley is formed of a rubber composition in which powdery or granular polyolefin resin is contained in ethylene-α-olefin elastomer.

* * * * *